May 1, 1945. G. S. MONK ET AL 2,374,768
PICTURE PROJECTOR
Original Filed June 19, 1940 5 Sheets-Sheet 2
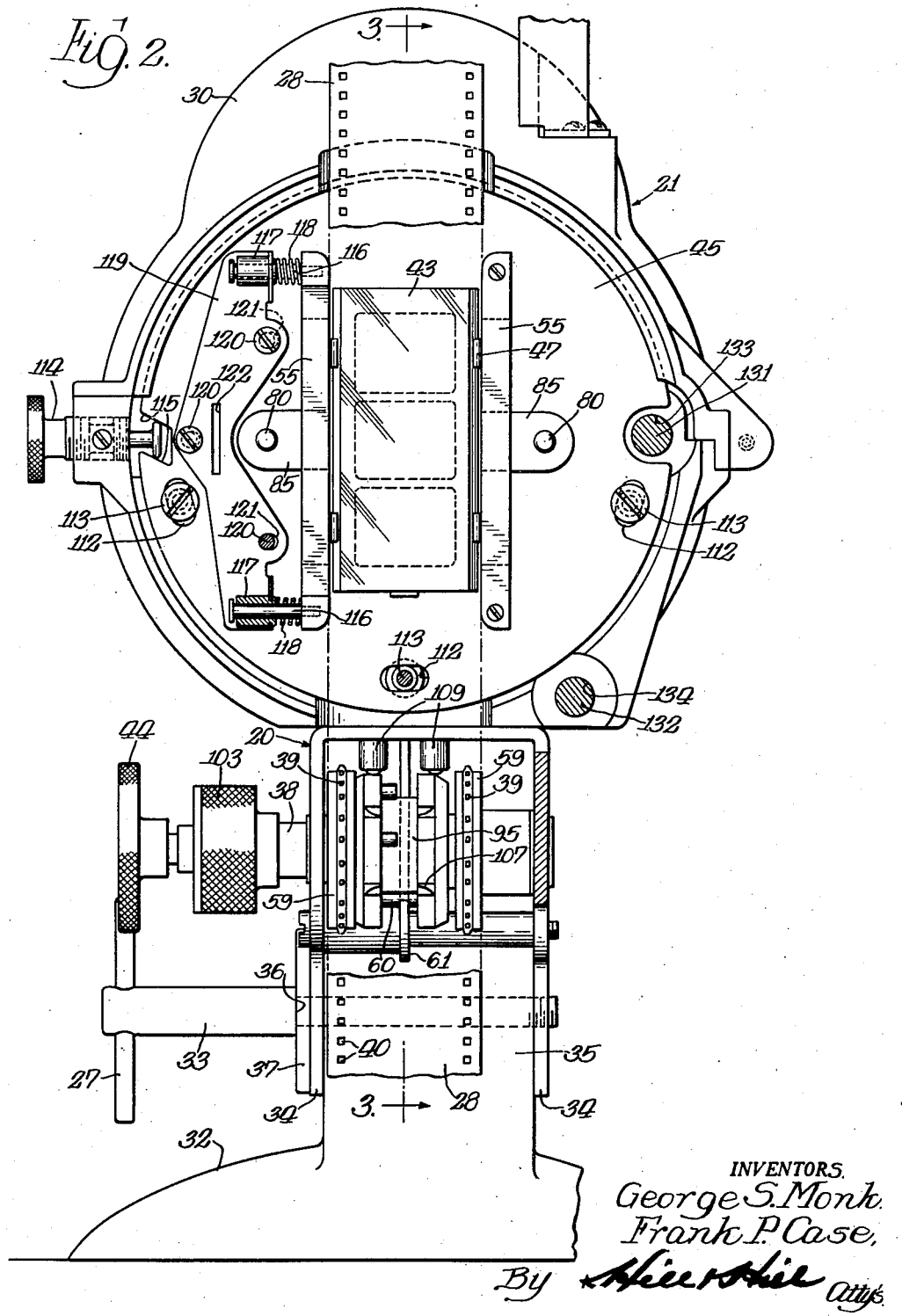
INVENTORS.
George S. Monk.
Frank P. Case,
By [signature] Attys.

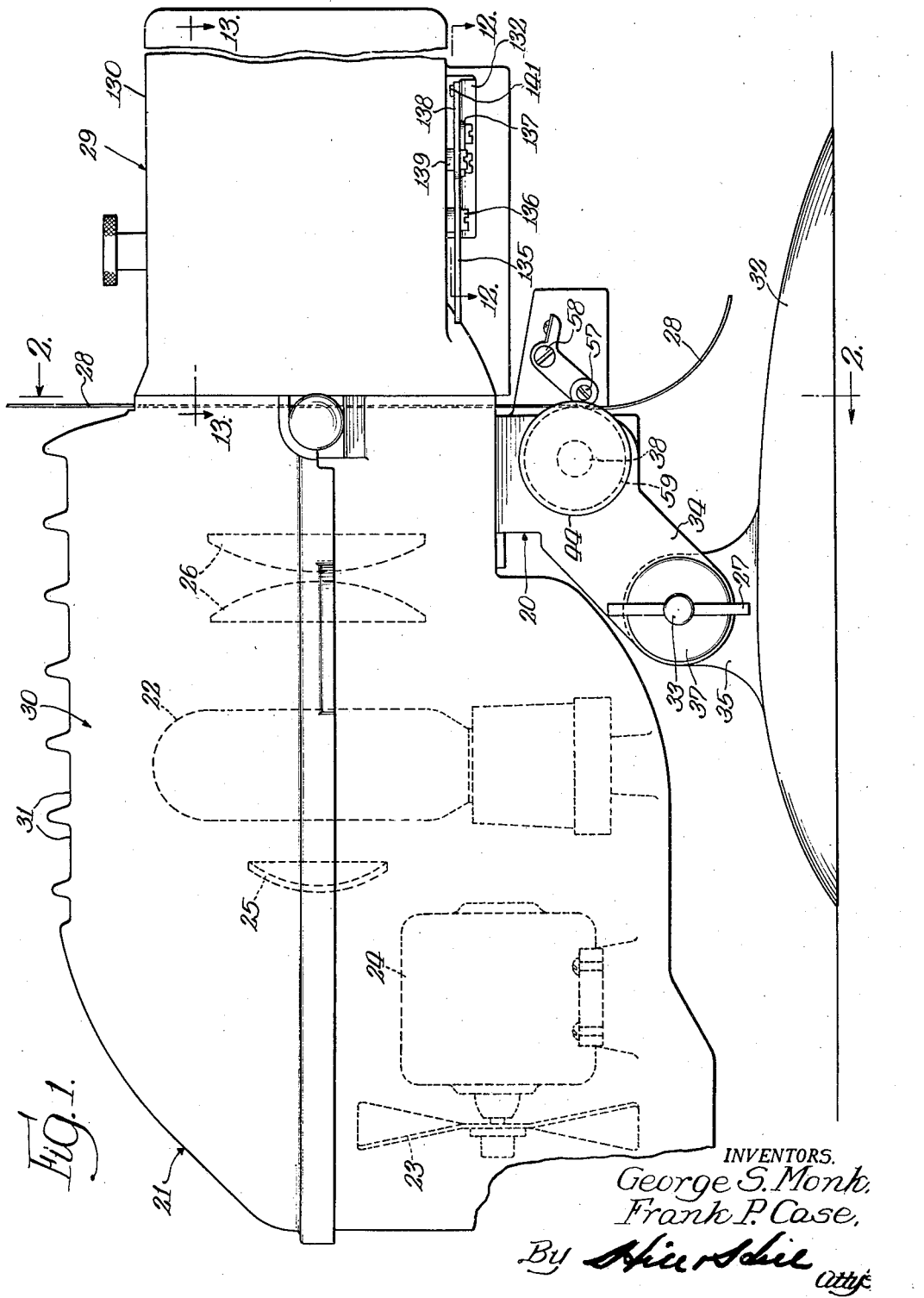

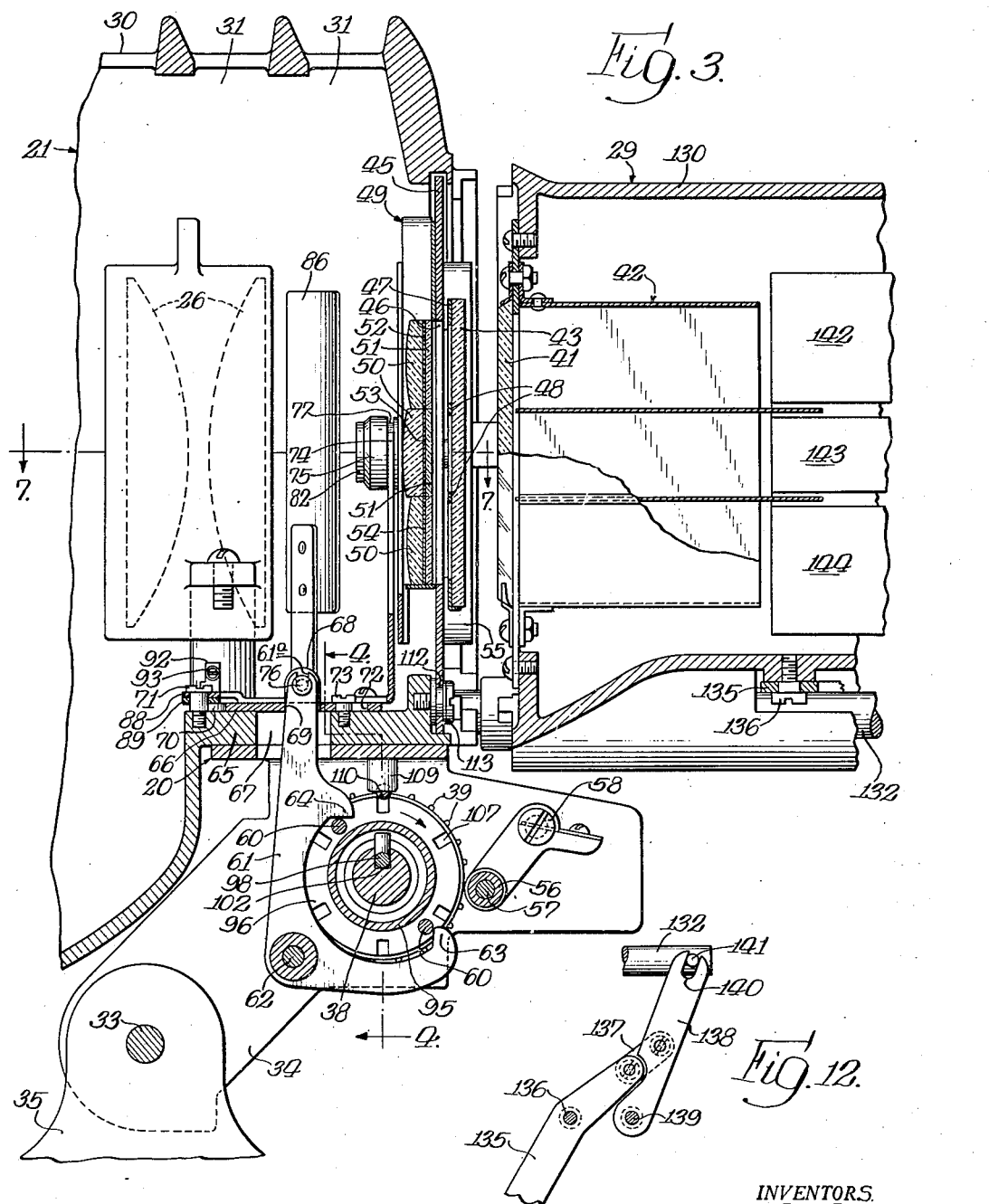

May 1, 1945. G. S. MONK ET AL 2,374,768
PICTURE PROJECTOR
Original Filed June 19, 1940 5 Sheets-Sheet 4
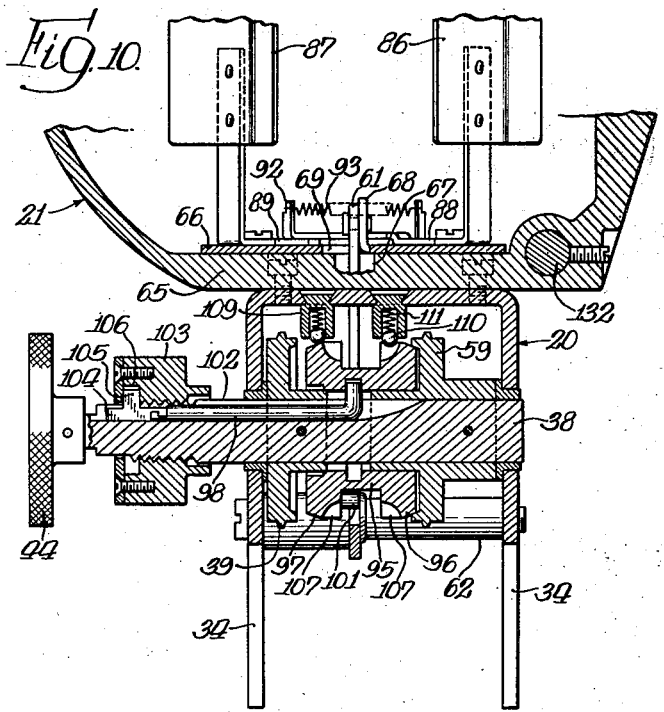
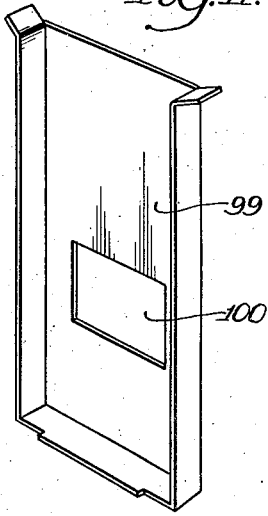
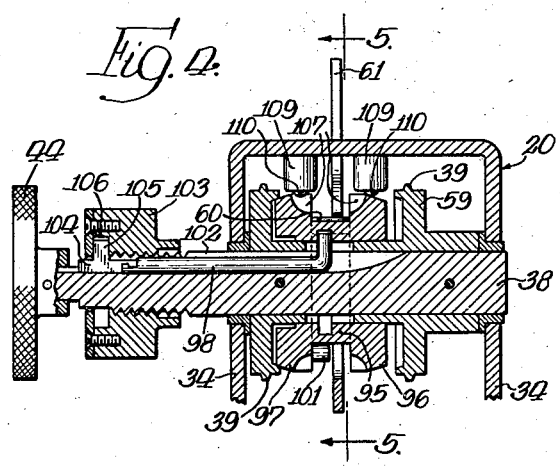
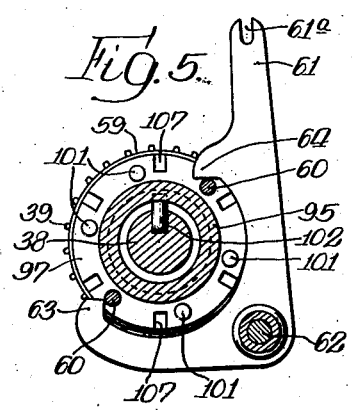
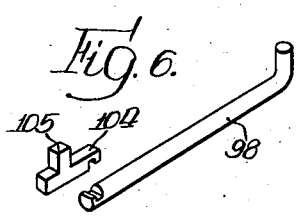
INVENTORS.
George S. Monk.
Frank P. Case.
By
Attys.

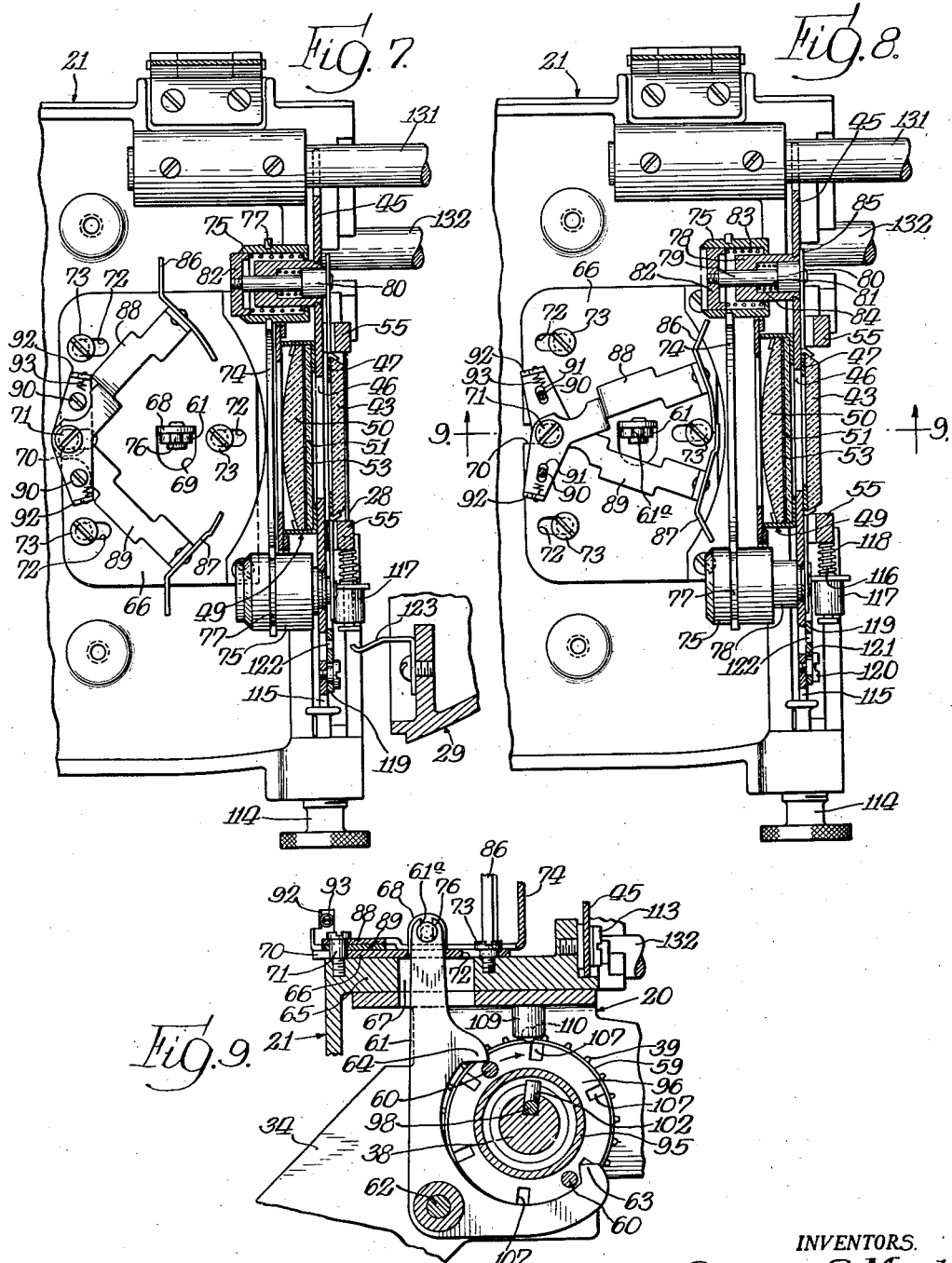

Patented May 1, 1945

2,374,768

UNITED STATES PATENT OFFICE 2,374,768

PICTURE PROJECTOR

George S. Monk and Frank P. Case, Chicago, Ill., assignors to Prismacolor, Inc., Chicago, Ill., a corporation of Illinois Original application June 19, 1940, Serial No. 341,314. Divided and this application October 8, 1942, Serial No. 461,244

7 Claims. (Cl. 88—28)

The present invention relates to a projector and refers more specifically to a new and novel arrangement and construction of a motion picture shutter therefor. The subject matter of the present invention also relates to and includes all the improvements and refinements that were divided out of our copending application, Serial No. 341,314, filed on June 19, 1940, now Patent Number 2,301,740, issued November 10, 1942, of which this is a divisional case.

One of the main objects of the present invention is to provide a practical and efficient shutter arrangement for use in a projector of any kind for motion picture work, and which shutter allows the removal and rethreading of film and the correct alignment and adjustment thereof for clear and precise projection. Obviously, the shutter mechanism of the present construction may be incorporated in various types of projectors whether they are used for black and white or color work whatever the case may be. One particular field of picture work requiring very accurate projection is color cinematography and it is to a projector of this type to which the present shutter has been applied. Such a projector in its general and more broad interpretation is well known to those familiar with the art, and the present machine which incorporates the new and novel shutter is of the class wherein individual images or color cutouts of the same photographed object provided by a film or plate are projected upon a screen by an assembly of juxtaposed lenses, the individual lenses being positioned in the path of light passing through the respective color cutouts and focused upon a screen in superimposed relation.

Another object of the invention is the provision of improved means for moving a lens housing away from and toward a projector case on which the housing is mounted to facilitate the insertion and removal of films.

Still another object of the invention is the provision of improvements in manually actuated film advancing and shutter actuating mechanism operable in proper sequence to close the shutter and to advance the film and to open the shutter upon completion of the film movement.

A further object is the provision of novel means for controlling the opening and closing of the shutter at different intervals corresponding to movement of a film through one frame opening for projection of a single image and for movement of the film through a distance corresponding to a plurality of frame centers.

A still further object of the invention is the provision of improvements in shutters of the kind described and in the mechanism operable to actuate the same whereby the shutters are opened and closed substantially instantaneously.

Still another object of the invention is the provision of improvements in projectors including lens mounts or housings of the kind described which are durable, simple, inexpensive to manufacture and satisfactory for their intended purpose.

Referring now to the drawings, wherein like reference characters indicate like or corresponding parts:

Fig. 1 is a side elevational view of a projector showing the general relation of various operating mechanisms thereof and including certain of the improved mechanisms of the present invention.

Fig. 2 is a vertical transverse sectional view taken substantially along the line 2—2 in Fig. 1.

Fig. 3 is a vertical sectional view taken on the longitudinal axis of a portion of the projector and as viewed substantially along the line 3—3 in Fig. 2.

Fig. 4 is a fragmentary sectional view taken substantially along the line 4—4 in Fig. 3.

Fig. 5 is a vertical sectional view of certain of the operating mechanisms illustrated in Fig. 4 and as taken along the line 5—5 therein.

Fig. 6 is a perspective view of certain cooperating elements incorporated in the present improved shutter mechanism.

Fig. 7 is a horizontal sectional view taken substantially along the line 7—7 in Fig. 3 illustrating the shutter actuating mechanism and certain other mechanisms associated with the shutter, the latter being shown in open position.

Fig. 8 is a view substantially identical to that illustrated in Fig. 7, but showing a changed position of certain mechanisms, such as the shutter in closed position.

Fig. 9 is a sectional view taken transversely with respect to Fig. 8 and along the line 9—9 indicated therein.

Fig. 10 is a sectional view taken in the same plane as Fig. 4 with the addition of certain other mechanisms as associated therewith.

Fig. 11 is a perspective view of an aperture plate utilized for the projection of single frame pictures, and Fig. 12 is a horizontal sectional view of certain of the operating linkages utilized in moving the lens housing away from and toward the projector case, said view being taken substantially along the line 12—12 in Fig. 1.

Referring now more particularly to the drawings, the projector comprises a suitable portable case 21 providing a housing for an electric lamp 22, a fan 23, a motor 24 for actuating the fan, a reflector 25, and condensers 26. The motor 24 is adapted to be operatively connected with any suitable source of electrical energy by a circuit not shown. A further description of the foregoing enumerated elements contained in the case 21 has been omitted since these elements may be of any construction and arrangement suitable to cause light to pass through a film 28 and through the lens mount or port housing generally designated by the numeral 29 and mounted on the front of the case as hereinafter more particularly described. A hinged cover 30 permits access to the case 21 and also provides a plurality of ventilating apertures 31 at or near the top of the case.

The case 21 and the lens mount or port housing 29 are operatively connected as hereinafter more particularly described and are tiltably mounted on a support 32 by means of a transversely extending horizontal pivot pin 33 as best illustrated in Figs. 1 and 2.

A pair of arms 34 project downwardly from the case 21 and engage the opposite ends of a lug 35 formed on the bottom support 32. One end of the pivot pin 33 threadedly engages the contiguous arm 34, and the other end of the pivot provides a shoulder 36 spaced from the contiguous end of the lug 35 and between which is positioned a washer 37. The pivot pin 33 can be rotated by a diametrically extending pin 27. The projector is rotatable about the pivot pin 33 as an axis to suitably incline the projector to the horizontal and may be fastened at any desired angle of inclination by turning the pivot pin 33 to clamp the arms 34 against the ends of the lug 35.

The film 28 extends through the projector as shown fragmentarily in Figs. 1 and 2, it being understood that the film is connected with suitable winding and unwinding devices not shown, disclosure of which is omitted as being unnecessary to an understanding of the invention.

A shaft 38, mounted on the case 21 preferably below and rearwardly of the juncture between the case and the lens mount 29, provides a mounting for two spaced apart circumferential rows of sprockets 39 operable to engage corresponding marginal rows of film apertures 40, whereby rotation of the shaft advances the film. The shaft 38 is journalled in an inverted U-shaped member 20 fastened to the bottom of the case 21. The lens mount 29 is normally in juxtaposition to the front end of the case 21, as shown in Fig. 1, and in this position and referring now to Fig. 3, a transparent plate 41 carried by a shadow box 42 fixedly mounted in the lens mount is engaged by the front face of the film 28, and a transparent pressure plate 43 mounted on the case 21 yieldably engages the rear face of the film 28, not shown. The shaft 38 is manually actuated by a knurled knob 44 and rotation thereof to move the film, initially moves the pressure plate 43 slightly away from the film to permit longitudinal movement of the latter freely and avoids the film being scratched or otherwise marred. Rotation of the shaft 38 not only releases the pressure plate 43 and moves the film 28, but also actuates shutter mechanism in proper sequence as hereinafter more particularly described.

The front wall of the case 21 comprises a relatively thin plate 45 providing an aperture 46 through which light from the lamp 22 is adapted to pass from the case 21 and thence through the film 28 and the lens or port housing 29. The pressure plate 43 overlaps the bounding edges of the aperture 46 and is mounted on a metal frame 47 positioned on that side of the plate opposite the film 28. The frame 47 has its opposite edges connected by integrally formed strips 48 whereby the pressure plate 43 provides an unobstructed window opening. A removable metal frame 49, mounted on the inside of the plate 45 is shown as carrying three condensers 50 and corresponding glass plates 51 between which are positioned filters 52, 53, and 54, respectively designated as red, blue and green. The filters correspond in area and in position to the three window areas of the pressure plate 43, it being understood that the construction may be modified if desired to use either glass or gelatin filters. A pair of pressure bars 55 mounted on and spaced from the front face of the plate 45 serve as guides engaging the opposite edges of the film 28 to maintain the film longitudinally straight both while the pressure plate 43 is moved away from the film to release the latter for movement and as the plate is moved toward the film to prevent buckling thereof and to keep the film in perfect alignment with the lenses, the control of which by a screw 114 is hereinafter explained. The film 28 is moved downwardly through the projector and is held in engagement with the sprockets 39 by a cylindrical tension roller 56 rotatable on a shaft 57 and swingably supported on a pivot 58. The sprockets 39 are supported on and form a part of the outer periphery of narrow rings or bands 59 integrally formed with or fixedly mounted on the shaft 38.

Cam mechanism, mounted on the shaft 38 between the bands 59, is operable by rotation of the shaft to release the pressure plate and close the shutter mechanism and to reengage the pressure plate with the film and to open the shutter mechanism in sequence for each partial revolution of the shaft. In projecting from films having three color cutouts of each photographed object corresponding to the red, blue and green filters as shown and described, the shaft is successively rotated through exactly 180° for each projection and in projecting from films having single frame pictures, the shaft is successively rotated through 60° for each projection upon a screen. Referring to Figs. 2, 3, 4, 5 and 9, the cam mechanism includes a sleeve 95 mounted on the shaft 38 between the bands 59, the sleeve providing fixedly spaced apart annular flanges 96 and 97 connected by diametrically opposite abutment rods 60 equally spaced from and extending parallel to the shaft 38. The sleeve 95 is rotatable with the shaft 38 and an L-shaped cam lever 61, tiltably mounted on a pivot 62, has its lower portion forming a cam 63 and its upper portion forming a cam 64 adapted to be simultaneously and successively abuttingly engaged by the oppositely positioned rods 60 as the shaft 38 is rotated. The case 21 provides a horizontal shelf 65 upon which a plate 66 is slidably mounted. The shelf provides an elongated aperture 67 and an intermediate portion of the plate 66 is partially severed and the partially severed portion is upturned to provide a standard 68, the upturned portion leaving an aperture 69 in the plate in registry with the aperture 67 in the shelf 65. One edge of the plate 66 provides a recess 70 through which extends a bolt 71, adapted to permit limited movement of the plate 66 in one direction on the shelf 65. The plate 66 also provides a plurality of elongated slots 72 extending parallel to the recess 70 and through each of which a bolt 73 extends to serve as a stop adapted to limit movement of the plate 66 in both directions. The upper end of the cam lever 61 projects through the registering recesses 67 and 69 and is operatively connected with the standard 68 by a bolt 76, fastened to the standard and slidable in a longitudinal recess or slot 61a provided by the cam lever 61.

Rotation of the shaft 38 through 180° brings the rods 60 successively into operative engagement with the cams 63 and 64 provided by the lever 61. The position of the cam lever 61 as shown in Figs. 3 and 5 corresponds to the open position of the shutters and the stationary position of the film 28, and the position of the lever 61 as shown in Fig. 9 corresponds to the closed position of the shutters and the retracted position of the pressure plate 43.

The plate 66 is moved from the position shown in Fig. 7, corresponding to the position of the cam lever 61 shown in Figs. 3 and 5, to the position shown in Fig. 8 corresponding to the position of the lever 61 in Fig. 9 by slight initial rotation of the shaft 38 in clockwise direction from the position shown in Fig. 3 to that shown in Fig. 9. The plate 66 is shown in Fig. 7 as being positioned as far to the front as its mounting permits and in Fig. 8, the plate is shown as being positioned as far to the rear as such mounting permits. A vertically extending U-shaped member 74, mounted on the front edge of the plate 66, has a pair of upper ends recessed or forked and respectively operatively engaging cylindrical sleeve members 75. The recessed ends of the member 74 closely fit annular grooves 77 on the outer periphery of the cylindrical sleeve members 75 so that said cylindrical members are moved longitudinally in an amount corresponding to the above described movement of the horizontal plate 66 by the cam lever 61.

The cylindrical sleeve members 75 each have a front annular and inturned flange engaging an inner sleeve member 78 which projects outwardly from and extends partially through the cylindrical members as best illustrated in Figs. 7 and 8. The sleeve member 78 has a riveted connection with the front plate 45 of the case 21 and as a result, is immovable relative to the case. A rod or plunger 79, having an enlarged end or head 80, is positioned in and projects from a bore 81 provided in the inner sleeve member 78. The rear end of the rod 79 has threaded engagement with a disc or annular plate 82 which closely fits within the rear end of the cylindrical sleeve member 75. A compression spring 83 has its ends respectively abutting the annular flange of the cylindrical sleeve member 75 and the disc 82. A spring 84 is positioned in the bore 81 with one end abutting the head 80 and the other end abutting the end wall of the bore 81. The heads 80 of the rods 79 are connected with lateral extensions 85 of the frame 47 bounding the pressure plate 43. Obviously, when the plate 66 is moved rearwardly from the position shown in Fig. 7 by initial rotation of the shaft 38, the relative positions of the cylindrical member 75, the inner member 78, the rod 80 and the annular plate 82 will be changed from those shown in Fig. 7 to the relative positions shown in Fig. 8 whereby the lateral extensions 85 of the frame 47 move the pressure plate 43 away from the film 28 to release the latter, the described movement being resisted by the springs 83 and 84. Continued rotation of the shaft 38 will cause the rods 60 to ride over and disengage the cams 63 and 64 and the springs 83 and 84 will then cause the cylindrical members 75, the member 78, the rod 80 and the plate 82 to take the relative positions shown in Fig. 8 wherein the pressure plate 43 is moved to again press the film 28 against the plate 41.

The movement of the plate 66 by the initial rotation of the shaft 38, operable to retract the pressure plate 43 as described, is also operable to move shutter plates 86 and 87 from their open position as shown in Fig. 7 to their closed position as shown in Fig. 8. The shutter plates 86 and 87 are respectively mounted upon the ends of arms 88 and 89. The arms 88 and 89 intersect adjacent the ends opposite to the shutter plates 86 and 87 and at their point of intersection the arms are pivotally connected with the bolt 71 which extends through the recess 70 in the plate 66. The ends of the arms 88 and 89, adjacent the bolt 71, are each pivotally connected with a bolt 90 mounted on and movable with the plate 66, the arms being provided with slots 91 containing the bolts 90 to permit oscillation of the arms about the bolt 71 as an axis. The extreme ends of the arms 88 and 89 are upturned to provide stems 92 connected by a tensile spring 93, the ends of the arms being relatively so inclined and the position of the bolts 71 and 90 being such that the connection of the arms by the spring 93 will operate as a toggle for actuating the arms for certain positions of the plate 66. In the position of the plate 66 shown in Fig. 7, the toggle mechanism is inactive by reason of the relative position of the bolts 71 and 90 and as the plate is moved to the position shown in Fig. 8, the bolts 90 are moved past the dead center line through bolts 90 and the pivotal bolt 70 and the spring 93 snaps the shutter plates 86 and 87 to their overlapping closed position as shown, in which position they remain while the film 28 is being advanced. As the shaft 38 approaches the end of its partial revolution, the rods 60 operatively engage the cams 63 and 64 and rotate the cam lever 61 from the position shown in Fig. 9, wherein the shutter plates 86 and 87 are closed and the pressure plate 43 is retracted to the position of the lever 61 shown in Fig. 3, wherein the shutter plates are open and the pressure plate 43 is positioned to engage the film 28 and to hold the same against the transparent plate 41 carried within the lens mount housing 29 by the shadow box 42.

A rod 98, shown in perspective in Fig. 6, is operable to move the sleeve 95 longitudinally of the shaft 38 from the position shown in Fig. 4 to the position shown in Fig. 10 and vice versa. The rod 98 is positioned in a key-way or recess 102 provided by the shaft 38, the inner end of the rod having a radial extension operatively engaging the sleeve 95. A knurled sleeve 103, threadedly engaging the shaft 38 adjacent the knob 44, is connected with the rod 98 by a key 104 which interlocks with the outer end of the rod as best shown in Figs. 4, 6 and 10. An angular projection 105 on the key 104 is positioned in an annular recess 106 in the sleeve 103. Threading of the sleeve 103 inwardly on the shaft 38 will actuate the key 104 and the rod 98 to move the sleeve 95 from the position of Fig. 4 to that of Fig. 10 and threading of the sleeve 103 outwardly will similarly operate to move the sleeve 95 from the position of Fig. 10 to that of Fig. 4. In using the device for color projection from three cutouts or frames on the film, the sleeve 95 is positioned as shown in Fig. 4, wherein the cam lever 61 is engaged only by the rods 60. Since the rods 60 are diametrically opposite, there is a sequence of operations of the shutter and pressure plates for each rotation of the shaft through 180° or for each one-half revolution thereof.

When the projector is to be used for projecting single frame motion pictures, a mask comprising the metal frame 99 shown in Fig. 11 is substituted for the removable condenser frame 49 carrying the condensers 50, the glass plates 51 and the filters 52, 53, and 54. The frame 99 provides a single aperture 100 through which light passes into the lens or port housing 29 and since there is only one film frame for each photographed object on the film 28 in black and white photography, it is necessary that the film be sequentially moved only the distance corresponding to the spacing of the centers of such frames. The connection of the film 28 with the shaft 38 is such that rotation of the shaft through 60° provides the requisite film movement necessary for successively bringing the film frames uniformly into register with the aperture 100 of the metal frame 99 in order that the photographed objective on the successively exposed film frames will be sequentially projected by rotation of the shaft through 60°.

The sleeve 95 occupies the position shown in Fig. 10 for projection of single frame pictures and in this position, the lever 61 is operatively engaged not only by the oppositely positioned rods 60, but is also abuttingly engaged by four pins 101, the pins and rods being equally spaced circumferentially so that the lever is operable thereby to actuate the shutters and pressure plate once for each rotation of the shaft through 60°.

In order that the shaft 38 will tend to stop at the proper position upon completion of rotation through 60°, six equally and circumferentially spaced recesses 107 are provided on each of the inner side faces of the flanges 96 and 97. A pair of spaced apart cam members are mounted on the U-shaped member 20, each consisting of a hollow cylinder 109 open at its lower end to provide a seat for a steel ball 110 held in partial projecting position by a compression spring 111. As observed in Figs. 4 and 10, the balls 110 will respectively revolve on the outer peripheries of the flanges 96 and 97 as the shaft 38 is rotated and thereby offer very slight resistance to rotation of the sleeve 95 by the shaft 38. The position of the balls 110 on the outer periphery of the flanges 96 and 97 is such as to prevent accidental rotation of the shaft 38 since one or the other of the balls will project into an adjacent recess 107 upon rotation of the shaft through 60° for all positions of the sleeve 95 and thereby tend to prevent rotation of the shaft 38 more than 60° other than by the exercise of force in excess of that normally necessary to rotate the shaft.

The plate 45 angularly adjustable to bring the longitudinal center line of the film 28 and of the metal frame 49 carrying the condensers 50, plates 51, and filters 52, 53, and 54 into exact vertical alignment within the plane containing the optical axes of the lenses carried by the lens mount 29, this adjustment being accomplished by providing curved slots 112 in the plate 45 and in which bolts 113 fastening the plate to the case 30 closely fit. Spring washers mounted on the bolts 113 are yieldable to permit the bolts to be moved in the curved slots 112 and the plate 45 to be rotated or oscillated about a point forming a common center for the radii of curvature of the slots, the point lying within the extended optical axial line of the middle lens positioned in the lens mount. A screw 114, having its inner end enlarged, is operable to rotate the plate 45 for adjustment. The enlarged end of the screw 114 engages cam faces 115 provided by the plate 45 as shown in Fig. 2 so that inward movement of the screw rotates the plate in one direction, and outward movement in the opposite direction.

The pressure bars 55 serve as parallel guides operatively engaging the opposite edges of the film 28. One of the plates 55 is laterally movable relative to the other to adjust the space between the plates to accommodate the film 28, and for this purpose, the movable plate is mounted on bolts or pins 116 which extend through corresponding openings in guides 117. The movable plate 55 is held in engagement with the adjacent edge of the film by spiral springs 118 mounted on the pins 116. A bar 119, providing a support for the guides 117, is slightly movable laterally toward and away from the film 28 by reason of the bar being fastened to the plate 45 by bolts 120 which are slidable in elongated slots 121 provided by the plate. The plates 55, engaging the edges of the film 28 as described, are so mounted on the plate 45 as to maintain the exposed portion of the film in proper longitudinal position. Since the pressure plates 55 are mounted on the plate 45, rotation of the latter will correspondingly rotate that portion of the film positioned between the pressure plates so that the longitudinal center line of the film is maintained in exact alignment with the optical axes of the lenses as the lenses are rotated by the plate 45 for adjustment as described above.

The spring 118 normally maintains the heads of the bolts 116 spaced from the guides 117 as shown in Fig. 2 so that the edges of the film 28 are under slight pressure laterally by reason of the resilience of the springs. The yieldable plate 55 is movable to engage and disengage the contiguous edge of the film 28 by movement of the lens or port housing 29 away from its closed position in contact with the case 21 and vice versa, and for this purpose, the bar 119 is provided with a slot 122 adapted to receive a latch plate 123 mounted on the lens mount. The port housing 29 is movable away from the projector case 21, by manually actuated mechanism hereinafter described, to the position shown in Fig. 7 to facilitate removal or insertion of a film in front of the pressure plate 43. The configuration and the position of the latch plate 123 are such that movement of the port housing 29 from the position shown in Fig. 7 to its normal position in contact with the case 21, wherein the film 28 will be clamped between the pressure plate 43 and the plate 41, results in the outer curved end of the latch plate 123 initially entering the slot 122 and moving the contiguous pressure plate 55, controlled by the bar 119 and the guides 117 away from the film. When the latch plate 123 is in its position corresponding to the closed position of the port housing 29, the inclined portion of the latch plate has moved the bar 119 back to the position wherein the respective pressure plates 55 operatively engage the opposite edges of the film 28 and maintain the film with its longitudinal center line in alignment with a plane containing the optical axes of the lenses carried by the port housing.

The port housing 29 comprises a casing 130 slidably supported on rods 131 and 132 rigidly fastened to and projecting from the front end of the projector case 21. The rods 131 and 132 project into or extend through and respectively closely fit cylindrical bores 133 and 134 formed on the inner sides of the casing 130. It is desirable that the port housing 29 be moved away from the projector case 21 in order that the film may be easily inserted, as previously described, and for this purpose, the casing 130 is arranged to be slidable back and forth on the rods 131 and 132. This movement of the casing 130 is accomplished by manually actuating a lever 135 connected to the bottom of the housing, intermediate the ends of the lever, by a pivot 136. A link 137 operatively connects the lever 135 with a lever 138 at a point intermediate the ends of the latter, as best shown in Fig. 12. The lever 138 is connected at one end with the casing 130 by a pivot 139 and the other end of the lever is provided with an elongated longitudinally extending recess 140. A pin 141, mounted on the rod 132, and projecting through and loosely fitting the recess 140 operatively connects the lever 138 with the rod. The described mounting and connection of the levers 135 and 138 by the link 137 is such that movement of the free end of the lever 135 toward the front end of the housing 130 causes the port housing 29 to move away from the projector case 21, and movement of the free end of the lever 135 toward the rear end of the housing moves the lens mount back to its normal closed position in proximity to or in contact with the projector case. The lever 135 is not only operable to actuate the port housing from open to closed position and vice versa, but it has a toggle action adapting it to lock the port housing in closed position so that initial movement of the housing toward its open position can only be accomplished by actuation of the lever. As a result of the toggle action there is no possibility of the port housing 29 being inadvertently or accidentally moved from the closed position.

Thus, it will be seen that the invention provides a novel arrangement of shutter mechanism and associated means for successively actuating and properly guiding a film for projecting clear cut images from color cutouts or from single-framed black and while film as the case may be.

Having thus described our invention, it is obvious that various immaterial modifications may be made in the same without departing from the general scope and field of our invention; hence, we do not wish to be understood as limiting ourselves to the exact form, construction, arrangement and combination of parts herein shown and described or to the uses mentioned.

What we claim as new and desire to secure by Letters Patent is:

1. In a picture projector having a main casing provided with film apertures and a lens housing shiftable toward and away from said main housing to permit the insertion and removal of a film, the combination of a pressure plate carried by said main casing and cooperating with said lens housing to hold the film in a predetermined relation to said lenses when said lens housing is shifted into operative relation with respect to said main casing, film advancing means having mechanism to alternately move said pressure plate into and out of film holding relation with said housing, and relatively movable pressure bars cooperating with said pressure plate to guide said film lengthwise through said projector, and means for angularly adjusting said pressure plate and said pressure bars to adjust the run of the film as the latter is moved between said main casing and said lens housing.

2. In a picture projector having a main casing provided with film apertures and a lens housing shiftable toward and away from said main housing to permit the insertion and removal of a film, the combination of a pressure plate carried by said main casing and cooperating with said lens housing to hold the film in a predetermined relation to said lenses when said lens housing is shifted into operative relation with respect to said main casing, film advancing means having mechanism to alternately move said pressure plate into and out of film holding relation with said housing, and relatively movable pressure bars cooperating with said pressure plate to guide said film lengthwise through said projector, and cooperative means connected with one of said bars and with said lens housing, respectively, whereby said bars are moved relatively with respect to each other to disengage the film while said housing is moved toward said main casing, and whereby said bars are again released for engaging the film when said housing reaches its operative relation with respect to said main casing of the projector.

3. In a picture projector having a main casing provided with film apertures, and a lens housing shiftable toward and away from said main casing to permit the insertion and removal of a film, the combination of a transparent plate carried by the lens housing and a pressure plate carried by said main casing and cooperating with said transparent plate of the lens housing to hold a film in flat condition when said lens housing is shifted into operative relation with respect to said main casing, means to guide said pressure plate to move in a right line direction toward and away from the transparent plate, rotatable film advancing means and pressure plate actuating mechanism actuated by said film advancing means to move said pressure plate out of film holding relation with the lens housing during initial rotation of said film advancing means in its cycle of operation and to move said pressure plate into film holding relation with said transparent plate of the lens housing at the conclusion of rotation of said film advancing means in its cycle of operation.

4. In a picture projector having a main casing provided with film apertures, and a lens housing shiftable toward and away from said main casing to permit the insertion and removal of a film, the combination of a transparent plate carried by the lens housing, a pressure plate carried by the main casing and co-operating with said transparent plate to hold the film in a flat condition when said lens housing is shifted into operative relation with respect to said main casing, means to guide said pressure plate to move in a right line direction toward and away from the transparent plate, rotatable film advancing means and pressure plate actuating mechanism actuated by said film advancing means to move said pressure plate out of film holding relation with the transparent plate during initial rotation of said film advancing means in its cycle of operation and to move said pressure plate into film holding relation with respect to said transparent plate at the conclusion of rotation of said film advancing means in its cycle of operation.

5. In a picture projector having a main casing provided with film apertures and a lens housing having lenses therein and shiftable toward and away from the main casing, the combination of a transparent plate carried by the lens housing and movable therewith, a transparent pressure plate carried by said main casing and cooperating with said transparent plate to hold the film in a predetermined relation to the lenses when said lens housing is shifted into operative relation with respect to said main casing, means to guide said pressure plate to move in a right line direction toward and away from the transparent plate, rotatable film advancing means and pressure plate actuating mechanism actuated by said film advancing means to move said pressure plate into and out of film holding relation with said housing during each cycle of operation of the film advancing means.

6. In a picture projector having a main casing provided with film apertures and a lens housing shiftable toward and away from said main casing to permit the insertion and removal of a film, the combination of a transparent plate carried by the lens housing, a pressure plate carried by the main casing and cooperating with said transparent plate to hold a film in a flat condition when the lens housing is shifted into operative relation with respect to said main casing, film advancing sprockets, a cam lever having oppositely disposed cams thereon, means associated with said sprockets for engaging said cams to rock said cam lever and operative connections between said cam lever and said pressure plate for shifting the latter into and out of pressing engagement with the film.

7. In a picture projector having a main casing provided with film apertures, and a lens housing shiftable toward and away from the main casing to permit the insertion and removal of a film, the combination of a transparent plate carried by the lens housing, a pressure plate in the main casing cooperating with said transparent plate to hold a film in a flat condition when the lens housing is shifted into operative relation with respect to said main casing, film advancing sprockets, a cam lever having oppositely disposed cams thereon, pins associated with said sprockets for engaging said cams to rock said lever, a U-shaped member guided to move in a horizontal direction and operatively connected to said cam lever, plate supporting members secured to said pressure plate and slidably guided to move in a horizontal direction, and operative connections between said U-shaped member and said plate supporting members.

GEORGE S. MONK.
FRANK P. CASE.